United States Patent
McGee et al.

(10) Patent No.: US 6,772,173 B1
(45) Date of Patent: Aug. 3, 2004

(54) SYSTEM AND METHOD FOR DYNAMICALLY PRESENTING A LIST OF ITEMS

(75) Inventors: Michael McGee, Mountain View, CA (US); Victor Shao, Redwood City, CA (US); David Abkowitz, Mountain View, CA (US); Rushan Jiang, Menlo Park, CA (US); Ravi Jupudy, Mountain View, CA (US); Rodrigo Lima, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 09/728,802

(22) Filed: Dec. 2, 2000

(51) Int. Cl.$^7$ .............................................. G06F 17/30
(52) U.S. Cl. .................................................. 707/104.1
(58) Field of Search ..................... 707/102, 2, 104.1, 707/100

(56) References Cited

U.S. PATENT DOCUMENTS 4,885,943 A * 12/1989 Tootell et al. ........... 73/861.77
5,689,717 A * 11/1997 Pritt ............................. 715/512
5,946,417 A * 8/1999 Bonneau et al. ............ 382/236
5,974,419 A * 10/1999 Ashby ........................ 707/100

* cited by examiner

Primary Examiner—Safet Metjahic
Assistant Examiner—Sana Al-hashemi
(74) Attorney, Agent, or Firm—Park, Vaughan & Fleming LLP

(57) ABSTRACT

A system and method are provided for presenting a list of items to a user via a device having a limited display capability. In general, the number of items in the list may be much greater than the device can display at once. A list module is configured to receive a list of items and determine the number of items, or ranges of items, that may be displayed at once. If the list contains too many items to be displayed on one card, the list module divides them into groups nearly equal in size, so that to display any one item requires the same or nearly the same number of cards. Until each range is less than or equal to the number of items that can be displayed simultaneously, the list module presents (e.g., transmits to the device) cards having successively smaller ranges. Eventually a card will have few enough items to be displayed individually, and the user may make a final selection.

25 Claims, 3 Drawing Sheets

SYSTEM AND METHOD FOR DYNAMICALLY PRESENTING A LIST OF ITEMS

BACKGROUND

This invention relates to the fields of computer science and electronic communications. More particularly, a system and method are provided for dynamically presenting a user with a list of items via a device having a relatively limited display area.

Devices such as computers, smart telephones (e.g., Internet-enabled or data telephones) and PDAs (Personal Digital Assistants) give users access to a variety of electronic systems, and may be used to obtain information, make a purchase, initiate a communication or take advantage of some other type of service. Whether booking a flight through an airline service or obtaining a telephone, movie or product listing, a stock quote, or other data, a user is frequently required to make a selection from a list of choices. The list from which a selection is to be made may be quite long, and the user's device may have a limited capability to display or otherwise present the possible selections.

In particular, portable wireless devices such as PDAs, two-way pagers, Internet-enabled telephones (e.g., phones that offer access to Internet services) or other smart telephones (e.g., phones that can receive data from a computer server, such as data and/or some voice telephones), and so on, typically have display screens that are only a few to several lines in height. And, when just one element of a list is displayed on each line, locating or selecting a particular element in a long list can be time consuming and may require repeated manipulation of the device's controls.

Some devices, or the systems or services presenting a list to a device, simply permit a user to scroll through the list element by element, or perhaps screen by screen, until the desired element is displayed, at which point it may be selected. Some other devices or services present a list via ranges of elements, but do so in inefficient ways. For example, such a device or service may present a first page or screen displaying several groups of elements, from which the user is to select a range or scroll to another page having more groups. After selecting one group of elements, the user may be provided with another page of sub-groups and/or elements within the selected group. However, the manner in which a list is divided into groups of elements is often hard-coded—perhaps for a particular device or type of device—and the groups may be selected so as to correspond to the controls of the device. Thus, list elements beginning with the letters "A," "B," or "C" may comprise a first group of elements that can be selected by pressing the "2" button on a wireless telephone, a second range of elements from "D" through "F" may be associated with the "3" button, etc. In this type of solution, the number of elements included in a group or associated with a particular control may vary widely from one group or control to another. As a result, the user may have to press several keys to reach a desired element in an over-populated group, while the elements in a less-crowded group can be reached and selected much faster.

Further, after the elements of a list are hard-coded for one method or order of presentation, if the contents of the list change (e.g., a member is changed, deleted or added), the presentation of the list must be re-coded.

Thus, what is needed is a system and a method for dynamically presenting a list of elements to a user, through a device having relatively limited display space, such that the location or selection of an element can be made efficiently. The device display may be physically small in size, such as the display of an Internet-enabled wireless telephone, or may be larger in size, such as a computer display, but may only be able to simultaneously display a relatively small number of elements in comparison to the size of the list.

SUMMARY

In one embodiment of the invention a system and method are provided for presenting a list to a user of a device having a relatively limited display area. When a user accesses an electronic system from such a device, a list that is to be presented to the user is dynamically manipulated to meet the limitations of the device. In particular, the list is presented in a manner that allows any item in the list to be selected in approximately the same number of screens or cards.

If the list includes too many items to be presented in one screen, then successive screens are presented having ranges of items, or individual items, from which the user makes a selection. Each range within a screen includes approximately the same number of items (e.g., plus or minus one) and, after a range is selected, a subsequent screen displays sub-ranges or items within the selected range.

When a list is received for presentation to a user, the number of items that can be displayed on a screen is determined. This value may change during list presentation. Based on the number of items in the list and the number of items that are simultaneously displayable, the list is divided into groups that are equal or nearly equal in size. The user selects a group and the items in the group are displayed for the user's selection or, if there are too many items in the group to be displayed simultaneously, the group is sub-divided into smaller groups and presented for the user's selection.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer, Internet-enabled telephone, data telephone, voice telephone capable of interacting with a data server, PDA (Personal Digital Assistant) or other portable device for interacting with Internet-style services (e.g., browsing). Details of such devices (e.g., processor, memory, data storage, display) may be omitted for the sake of clarity.

In particular, an embodiment of the invention described below is well suited for use with a computing or communication device having a limited display area. For example, a portable device such as a telephone configured to offer access to Internet services may be considered to have a limited display area, in that it has a restricted number of lines (e.g., two to nine) with which to display information. However, even a large (e.g., nineteen or twenty-one inch) computer monitor may be considered to have a relatively limited display area if it is to be used to present a user with a list of many more items than can be displayed at one time.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and method are provided for dynamically presenting a list to a user of a device having a limited display capability or area. The device may be, for example, a wireless Internet-enabled telephone used to access (e.g., browse) electronic services via a wireless Internet connection. The method allows a list to be accessed, searched or viewed by the user in an efficient manner. For example, in one implementation of this method every item in the list may be reachable via the same (or almost the same) number of steps, wherein each step involves pressing or manipulating a control, button or key of the device or otherwise selecting an item or group of items from the list.

The system in which a method of the invention is implemented may include a computer system (e.g., a server) that hosts a service accessed by a user. Illustratively, the computer system may also include a list module or other set of computer executable instructions for presenting a list of items to the user or configuring it for presentation to the user.

The number of items that may be presented on the device display simultaneously may affect how the list is presented. For example, if the list includes too many items to display them all simultaneously on one screen, then the items may be divided into ranges or groups of items, where each range includes a unique (or overlapping) subset of items. The number of ranges and/or the size of a range (e.g., the number of items in the range) may therefore depend on how many items or ranges can be displayed simultaneously.

As the user navigates a presented list to find a particular item—for example, by successively selecting smaller and smaller ranges that include the item—the items in the selected range may be presented in the same manner as the previous range. In particular, and starting with the entire list of items, for each group of items to be presented to the user the method may first determine if all items in the group can be displayed simultaneously on the device. If so, they are displayed. Otherwise, the items are divided, assigned or segmented into subsets of the present group that are equal or nearly equal in size (e.g., differing by no more than one), and a range (e.g., a range of item names, numbers or other values) encompassing the items is associated with each subset. The number of subsets into which the group is divided is small enough so that all of the ranges can be displayed simultaneously. These ranges are then presented to the user, a selection is made, and the process is repeated.

Figure 1:
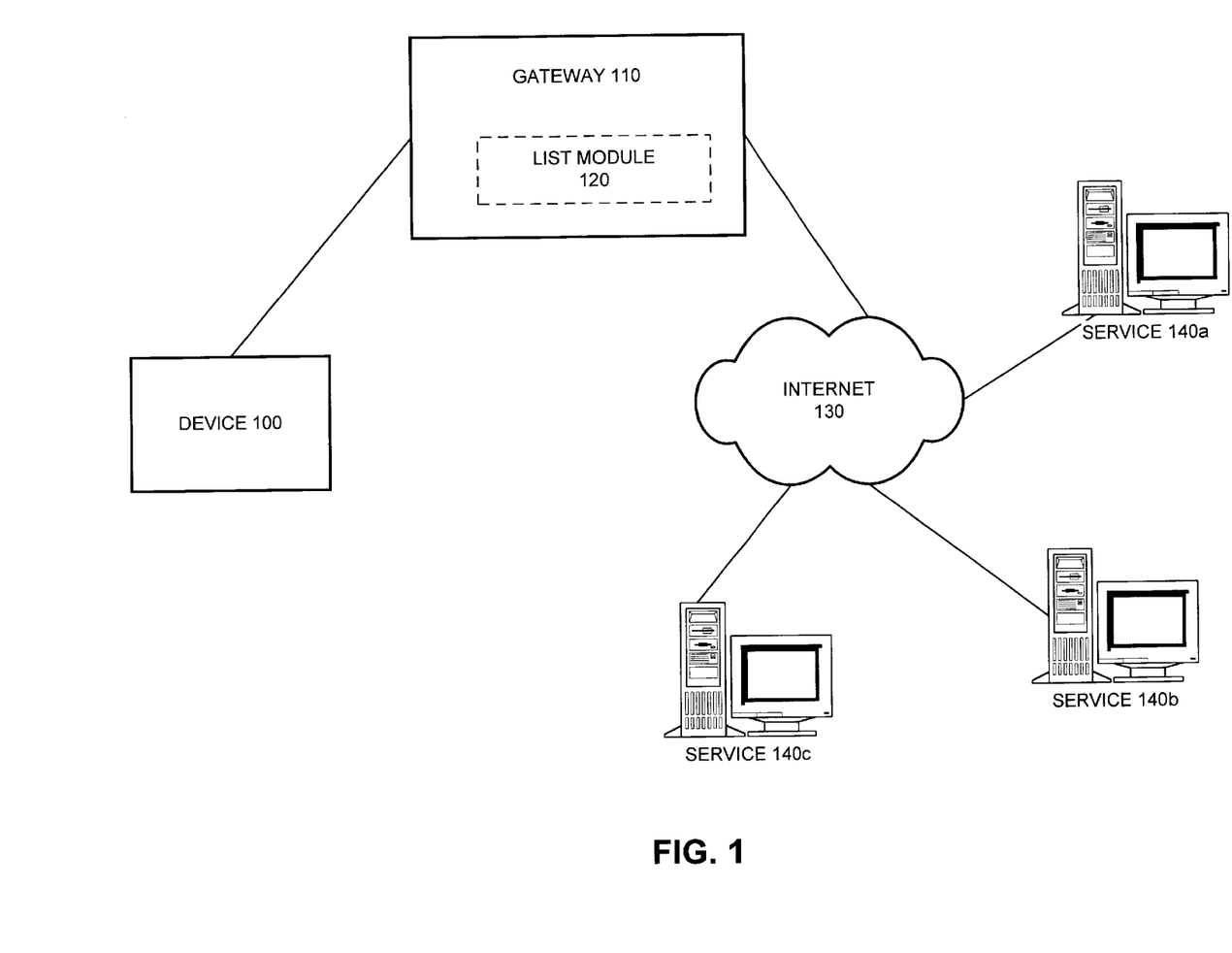
FIG. 1 is a block diagram depicting one computing or communication environment in which an embodiment of the present invention may be implemented.

FIG. 1 depicts an illustrative computing environment in which an embodiment of the invention may be practiced. In FIG. 1, a user operates device 100 to connect to gateway 110 and access various services 140 via the Internet 130. Services 140a, 140b, 140c may comprise any sources of information, electronic services, portals or other systems through which the user can access, retrieve, download or just view information, or perform tasks such as making a reservation, communicating with another user, purchasing something, etc.

Device 100 may be, in a present embodiment of the invention, a portable wireless communication or computing device such as an Internet-enabled or data telephone, a PDA, a laptop or hand-held computer, or other device now known or hereafter conceived. Device 100 may be configured to use the Wireless Access Protocol (WAP) or other present or future communication protocols for accessing, retrieving or exchanging data. One or more methods of the invention described shortly are particularly well suited for a device having a limited display capability, such as a wireless telephone capable of displaying just several lines of information at once.

Gateway 110 may be a computer system configured to accept connections from devices such as device 100 and act as an interface or conduit between the device and various information services or sources. In particular, in an embodiment of the invention in which device 100 is a wireless Internet-enabled telephone, gateway 110 may comprise one or more computer servers configured to offer or facilitate Internet access for such telephones.

In the embodiment of FIG. 1 gateway 110 includes list module 120, which is configured to receive a list (e.g., from one of services 140a, 140b, 140c) and present it to a user through device 100. In other embodiments of the invention list module 120 may be part of device 100, an electronic service (e.g., service 140a) accessed via Internet 130, or may be part of another computer system or service not depicted in FIG. 1. Although list module 120 may operate dynamically to present a list when needed by a user, it may also operate proactively, meaning that it may be used to pre-configure a list for presentation or pre-determine how a list should be presented. Pre-configured lists may be stored on gateway 110 and/or the source of the list.

List module 120 may be configured to operate, as described shortly, after an electronic service has been accessed on behalf of a user, such as when a list is to be presented to the user so that he or she may make a selection therefrom. Alternatively, list module 120 may be part of a service that receives a connection on behalf of the user and, as part of its operation, presents a list to the user.

Figure 2A:
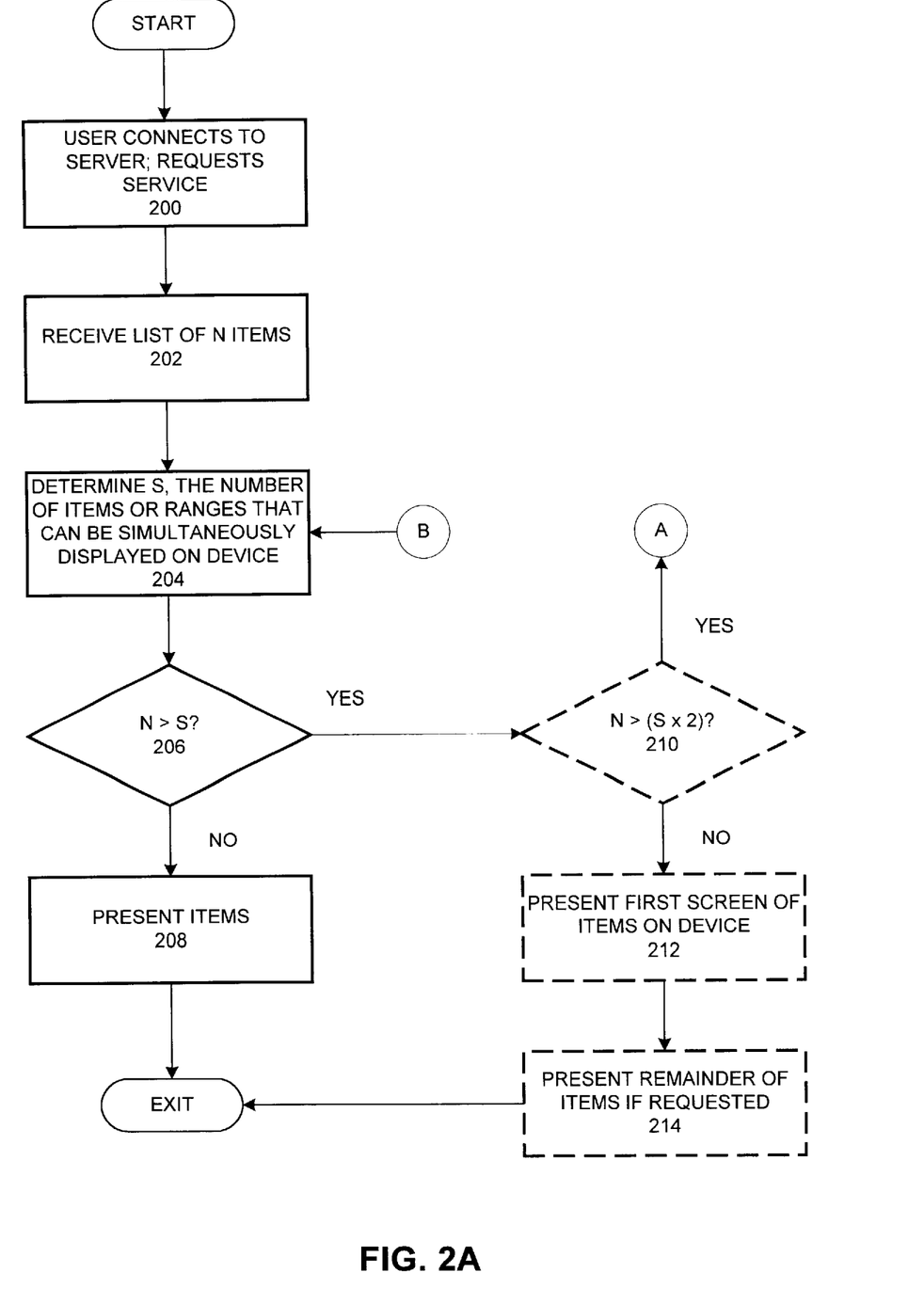
FIGS. 2A–2B comprise a flowchart demonstrating one method of presenting a list to a user of a device having a limited display area, in accordance with an embodiment of the invention.
Figure 2B:
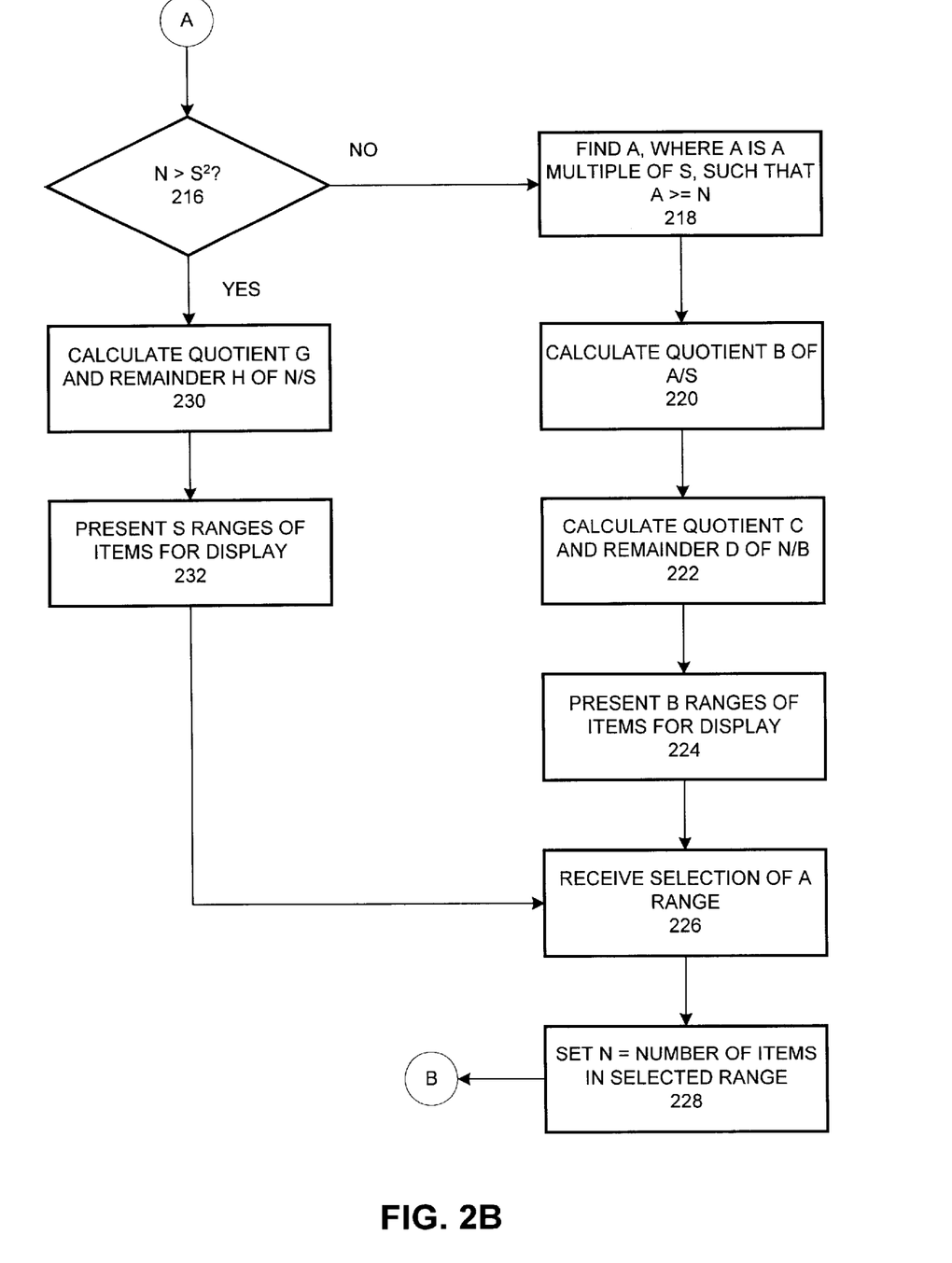

FIGS. 2A–2B demonstrate, for one embodiment of the invention, a method of presenting a list of items to a user on a device having a small display area or a limited display area in comparison to the number of items to be presented.

In state 200 of FIG. 2A, a user of such a device employs it to connect to a server, gateway, portal or other computer system configured to provide the device with access to information, network services, etc. In particular, the server may be configured to provide access to the Internet or another network to the user, in which case the device and server may communicate via WAP or some other suitable communication protocol.

Also in state 200, the user requests information or a service that the server provides or that it can satisfy (e.g., by connecting to an appropriate web site or computer system). Such a request may be made through a user interface (e.g., a browser, a menu) on the device. However, to complete or satisfy the request a selection must be made, from a list—such as a list of airline flights, a list of items or sale, a listing from white or yellow pages of a telephone directory, etc.

Therefore, in state 202 a list module operating on or in conjunction with the server receives, retrieves or otherwise accesses the necessary list. For example, if the server connected to a web site on behalf of the user, the web site may transmit the list to the server and may wait for a selection to be made. As another example, the server may host a database containing the information the user seeks, in which case the list module may receive or retrieve the list from the database. The number of items in the list is represented herein by the variable N.

In one alternative embodiment of the invention the list module may be built into a web site or electronic service that the user is accessing. In this case the list module operates at the information source rather than at a system that connects the device to the source. In another alternative embodiment of the invention the list module may operate on the device itself.

In state 204 the list module determines the display capability or display size of the device. In particular, the module must determine how many items, or ranges encompassing groups of items, the device can display at once. The number of items/ranges that can be displayed simultaneously is represented herein by the variable S.

The presently described method of the invention is particularly suitable for use with a device having a constant value of S throughout execution of the method. However, depending on how the list is to be presented on the device, the value of S may change. For example, a first display screen, card or page that a user sees when accessing a list presented through the list module may include other choices allowing the user to directly enter (e.g., spell out) an item, retrieve a previous selection, access or use preset or shortcut keys, cancel use of the service, etc. Thus, the service accessed by the user, or the user interface of the device, may include an option to retrieve a previous selection made by the user. The algorithm(s) discussed below may be modified to allow for a changing value of S during presentation of a list.

In state 206 the list module determines whether there are too many items to fit on one screen or card of the device display. If, for example, N<=S, then in state 208 all of the items may be simultaneously displayed and the user may select one. In this case the method ends after state 208. Otherwise, if N>S, then the method continues at state 210.

In state 210 the list module determines whether there are few enough items to be fully and individually listed with just two screens or cards. If, for example, S is constant for the first two screens, the module can simply determine whether N>(2*S). If not, then the illustrated method proceeds to state 216.

In state 212 a first subset (e.g., half) of the items is presented (e.g., transmitted to the device for display) to the user. If the user chooses to see the other items (e.g., by scrolling, pressing a corresponding key or button), then the remainder is presented in state 214. Otherwise, the method ends when the user selects an item from the first subset.

States 210–214 are optional in this embodiment of the invention. In particular, states 210–214 demonstrate how special treatment may be applied to make location or selection of an item faster in certain cases. By immediately displaying some (e.g., half) of the items if they can all be shown in two screens, the user can immediately make his/her selection if it is on the first screen. And, accessing the remainder only requires one more step. States 210–214 may be omitted, in which case the list having less than approximately two times the value of S is presented in states 216–228 with a first screen displaying several ranges, each range representing up to two items. The user then selects one and the items included in that range are displayed on the next screen.

In state 216, the list module determines whether $N>S^2$. In particular, if S items or ranges can be displayed simultaneously, then the user can make a selection from a list containing up to $S^2$ items with just two screens or cards. A first screen will be displayed having up to S ranges of items, and the size of each range (e.g., the number of items in the subset of items covered by the range) will differ from the others by only a small value (e.g., no more than one), with a maximum size of a range (e.g., number of items in the range) being S. The user can then select a range and, on a second screen, all of the individual items included in that range can be separately displayed and selected.

The comparison in state 216 can be adjusted if S is not constant for each screen or card. For example, if a screen or card uses one line or slot for some other purpose (e.g., to allow the user to do something else, such as access preset choices, enter an item manually or retrieve a previous selection), then the list module may determine whether $N>(S^2$ minus the total number of lines used for other purposes on all cards). Other adjustments can be made as needed.

In the illustrated embodiment of the invention, if $N>S^2$ then the illustrated method proceeds to state 230; otherwise, it continues at state 218.

In state 218, the list module determines the value A that is greater than or equal to N, but which is a multiple of S. And, in state 220 the list module calculates the value B=A/S, which represents the number of ranges that will be displayed on the first screen.

In state 222 the list module calculates the quotient C and remainder D of N divided by B, which determines how many items should be included in or encompassed by each of the B ranges to be presented on the first screen.

Then, in state 224 the list module presents a first screen or card for display to the user. The first screen will display B ranges and, in this embodiment of the invention, the first D ranges will encompass (C+1) items, while the other (B–D) ranges include C items.

In state 226 the user selects one of the ranges and the list module receives that selection. Then, in state 228 the list module replaces the previous value of N with the size of (e.g., the number of items in) the selected range, and returns to state 204. In this case, because the number of items in the original list was no greater than $S^2$, the method will proceed to states 206 and 208 and present all of the items in the selected range. Because a list may include hundreds or thousands of items, recursive operation of the list module algorithm allows faster processing and presentation of the list.

State 230 of the method is reached when the number of items in the list is greater than $S^2$, In this event, more than two screens or cards will be needed to keep each item selectable or accessible in (approximately) the same number of screens or cards. It can be seen that with large numbers of items, successive screens of ranges will be presented until the user selects a range having no more than S items.

Therefore, in state 230 the list module calculates the quotient G and remainder H of N divided by S, in order to determine the size of each range to be displayed on the first card. In state 232 the list module presents a first screen or card to be displayed to the user. The first screen will display S ranges and, in this embodiment of the invention, the first H ranges will encompass (G+1) items, while the other (S–H) ranges encompass G items.

After state 232, the illustrated method returns to state 226 to accept the user's selection of a range, reset N to the number of items in the selected range, and re-enter the algorithm at state 204. In an embodiment of the invention in which S does not change during the presentation of a list, state 228 may be followed by state 206.

FIGS. 2A–2B and the preceding discussion address one illustrative method of presenting a list to user of a device such as a telephone capable of accessing and interacting with Internet-style services. Other suitable methods may be derived from the foregoing without exceeding the scope of the invention.

In one embodiment of the invention, part of the function of a list module may be to identify items and/or item ranges in an unambiguous manner. Because, as described above, a list module may attempt to use equally sized or nearly equally sized ranges of items, adjacent ranges in an alphanumerically sorted listed may include items beginning with or having several common characters or digits. And, the size of the device display (e.g., the number of characters that can be displayed on one line) may limit the number of characters or digits that can be used to identify an item or range.

In this embodiment, the portion of an item's name, title or identifier that is presented or displayed may be just enough to uniquely identify it, thus identifying items with the shortest, unique title or label. For example, if a list of countries is being presented and there are too many countries to list them all simultaneously, as described above they may be presented in ranges. In this embodiment, if one range ends with an item similar to the first item in the next range, they may be differentiated as necessary. Thus, if a first range of country names ends with Columbia, and the next range begins with another country starting with "C," such as Croatia, the first range may be presented as "A–Co" and the second range as "Cr–F," rather than "A–C" and "C–F" which would give insufficient indication of where the first range ends and the second begins.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A computer-implemented method of presenting a list of items, comprising:
   (a) receiving a list of N items intended for presentation to a user;
   (b) dividing said items into a plurality of ranges, each of said ranges comprising a subset of said items;
   (c) presenting said plurality of ranges for display to the user;
   (d) accepting a selection, from the user, of a first range in said plurality of ranges;and
   (e) if the size of said first range is greater than one, repeating steps (b) through (e) for the items in said first range, wherein the size of said first range comprises the number of items in said first range;
   wherein the size of each range in each said plurality of ranges differs from the size of each other range in said plurality of ranges by no more than one.

2. The method of claim 1, wherein the user is presented said items via a device, and said receiving a list of items comprises receiving a list from an electronic service accessed by the user.

3. The method of claim 2, further comprising:
   if the size of said first range is equal to one, forwarding the selection of the item in said first range to the electronic service.

4. The method of claim 1, wherein said presenting comprises identifying said ranges to a device configured to display said items to the user.

5. The method of claim 4, wherein said accepting comprises receiving from the device an identification of one of said plurality of ranges.

6. The method of claim 1, wherein said presenting comprises displaying said ranges for the user.

7. The method of claim 1, wherein said dividing comprises determining the number S of items that may be simultaneously displayed to the user.

8. A computer-implemented method of facilitating the selection of an item from a list of items, by a user of a device having a relatively limited display area, comprising:
   (a) receiving a connection from a user;
   (b) receiving a list of items for presentation to the user on a device having a display;
   (c) identifying a plurality of ranges, each of said ranges covering a subset of said items, wherein the number of items in any one subset of said plurality of subsets differs from any one other of said subsets by no more than one;
   (d) accepting, from the user, a selection of one of said plurality of ranges; and
   (e) if said subset associated with said selected range comprises more than one item, performing steps (c) through (e) for the items in said selected range.

9. The method of claim 8, further comprising:
   (f) if said subset includes only one item, accepting selection of said one item.

10. The method of claim 8, wherein said receiving a connection comprises receiving a wireless connection from a wireless telephone configured for accessing a public network.

11. The method of claim 8, wherein said receiving a list comprises:
    accessing an information source on behalf of the user; and
    receiving from the information source a list from which the user is to make a selection.

12. The method of claim 8, wherein said identifying a plurality of ranges comprises identifying a plurality of ranges of items for display to the user.

13. A computer-implemented method of facilitating the selection of an item from multiple items, comprising:
    (a) receiving a set of N items, wherein said items are intended for representation to a user via a communication device for selection of one of said items by the user;

(b) determining the number of items, denoted S, that can be simultaneously displayed on the device;
(c) if N<=S, identifying said items for display to the user;
(d) if S<N<=S$^2$:
  calculating the smallest number A that is a multiple of S such that A>=N;
  calculating the quotient B of A/S;
  calculating the quotient C and remainder D of N/B;
  presenting the user with B subsets of said items, wherein the size of each of D of said B subsets is C+1 and the size of each of the other (B-D) subsets of said B subsets, if (B-D)>0, is C;
  accepting a selection of one of said B subsets; and
  performing said step (c) for the items in said selected subset; and
(e) if N>S$^2$:
  calculating the quotient G and remainder H of N/S;
  presenting the user with S subsets of said items, wherein the size of each of H of said S subsets is (G+1) and the size of each of the other (S-H) subsets, if (S-H)>0, is G;
  accepting a selection of one of said S subsets; and
  performing said step (e) for the items in said selected subset;
wherein said user may select one of said displayed items.

14. The method of claim 13, wherein said receiving a set of items comprises receiving identifiers of said items.

15. The method of claim 13, wherein said receiving a set of items comprises receiving a list of items from which the user is to select an item.

16. The method of claim 13, wherein said presenting the user with B subsets of said items comprises identifying said B subsets to the device for display to the user.

17. A computer-implemented method of facilitating the selection of an item from multiple items, comprising:
  (a) receiving a number N of items, wherein said items are intended for representation to a user via a communication device for selection of one of said items by the user;
  (b) determining the number S of items that can be simultaneously displayed on the device;
  (c) if N<=S, identifying said items for display to the user;
  (d) if N>S and N<2*S:
    presenting said user with a first subset of said items; and
    if said user makes a selection other than one of said first subset of items, presenting said user with said items other than said first subset of items;
  (e) if N>2*S and N<S$^2$:
    calculating the smallest number A that is a multiple of S such that A>=N;
    calculating the quotient B of A/S;
    calculating the quotient C and remainder D of N/B;
    presenting the user with B subsets of said items, wherein the size of each of D of said B subsets is C+1 and the size of each of the other (B-D) subsets of said B subsets, if (B-D)>0, is C;
    accepting a selection of one of said B subsets; and
    performing said step (c) for the items in said selected subset; and
  (f) if N>S$^2$:
    calculating the quotient G and remainder H of N/S;
    presenting the user with S subsets of said items, wherein the size of each of H of said S subsets is (G+1) and the size of each of the other (S-H) subsets, if (S-H)>0, is G;
    accepting a selection of one of said S subsets; and
    performing said step (e) for the items in said selected subset;
wherein said user may select one of said displayed items.

18. A computer readable storage medium storing instructions that, when executed by a computer, cause the computer to perform a method of facilitating the selection of an item from a list of items, by a user of a device having a relatively limited-display area, the method comprising:
  (a) receiving a connection from a user;
  (b) receiving a list of items for presentation to the user on a device having a display;
  (c) identifying a plurality of ranges, each of said ranges covering a subset of said items, wherein the number of items in any one subset of said plurality of subsets differs from any one other of said subsets by no more than one;
  (d) accepting, from the user, a selection of one of said plurality of ranges; and
  (e) if said subset associated with said selected range comprises more than one item, performing steps (c) through (e) for the items in said selected range.

19. An automated system for presenting a list of items to a user, comprising:
  a service module configured to provide a service to the user, wherein said service comprises presenting a list of items from which a selection can be made; and
  a list module configured to present said list of items by:
    (a) identifying a plurality of ranges, each of said ranges comprising a subset of said items;
    (b) presenting said plurality of ranges to the user;
    (c) accepting a selection of one of said plurality of ranges by the user; and
    (d) if said subset associated with said selected range comprises more than one item, performing steps (a) through (d) for the items in said selected range.

20. The system of claim 19, wherein said service module comprises said list module.

21. The system of claim 19, further comprising:
  a communication device used by the user to access said service, wherein said list is presented to the user via said device.

22. The system of claim 19, wherein said list module is configured to determine a display capability of a communication device on which said list will be presented.

23. A computer readable storage medium storing instructions that, when executed by a computer, cause the computer to perform a method of facilitating the selection of an item from multiple items, the method comprising:
  (a) receiving a set of N items, wherein said items are intended for representation to a user via a communication device for selection of one of said items by the user;
  (b) determining the number of items, denoted S, that can be simultaneously displayed on the device;
  (c) if N<=S, identifying said items for display to the user;
  (d) if S<N<=S$^2$;
    calculating the smallest number A that is a multiple of S such that A>=N;
    calculating the quotient B of A/S;
    calculating the quotient C and remainder D of N/B;
    presenting the user with B subsets of said items, wherein the size of each of D of said B subsets is C+1 and the size of each of the other (B-D) subsets of said B subsets, if (B-D)>0, is C;

accepting a selection of one of said B subsets; and
performing said step (c) for the items in said selected subset; and (e) if $N>S^2$:

calculating the quotient G and remainder H of N/S;

presenting the user with S subsets of said items, wherein the size of each of H of said S subsets is (G+1) and the size of each of the other (S-H) subsets, if (S-H)>0, is G;

accepting a selection of one of said S subsets; and performing said step (e) for the items in said selected subset;

wherein said user may select one of said displayed items.

24. A computer readable storage medium storing instructions that, when executed by a computer, cause the computer to perform a method of facilitating the selection of an item from multiple items, the method comprising:

(a) receiving a number N of items, wherein said items are intended for representation to a user via a communication device for selection of one of said items by the user;

(b) determining the number S of items that can be simultaneously displayed on the device;

(c) if $N<=S$, identifying said items for display to the user;

(d) if $N>S$ and $N<2*S$:

presenting said user with a first subset of said items; and if said user makes a selection other than one of said first subset of items, presenting said user with said items other than said first subset of items;

(e) if $N>2*S$ and $N<=S^2$:

calculating the smallest number A that is a multiple of S such that $A>=N$;

calculating the quotient B of A/S;

calculating the quotient C and remainder D of N/B;

presenting the user with B subsets of said items, wherein the size of each of D of said B subsets is C+1 and the size of each of the other (B-D) subsets of said B subsets, if (B-D)>0, is C;

accepting a selection of one of said B subsets; and performing said step (c) for the items in said selected subset; and (f) if $N>S^2$:

calculating the quotient G and remainder H of N/S;

presenting the user with S subsets of said items, wherein the size of each of H of said S subsets is (G+1) and the size of each of the other (S-H) subsets, if (S-H)>0, is G;

accepting a selection of one of said S subsets; and performing said step (e) for the items in said selected subset;

wherein said user may select one of said displayed items.

25. A computer readable storage medium storing instructions that, when executed by a computer, cause the computer to perform a method of presenting a list of items, the method comprising:

(a) receiving a list of N items intended for presentation to a user;

(b) dividing said items into a plurality of ranges, each of said ranges comprising a subset of said items;

(c) presenting said plurality of ranges for display to the user;

(d) accepting a selection, from the user, of a first range in said plurality of ranges; and (e) if the size of said first range is greater than one, repeating steps (b) through (e) for the items in said first range, wherein the size of said first range comprises the number of items in said first range;

wherein the size of each range in each said plurality of ranges differs from the size of each other range in said plurality of ranges by no more than one.

\* \* \* \* \*

UNITED STATES PATENT AND TRADEMARK OFFICE
CERTIFICATE OF CORRECTION

PATENT NO. : 6,772,173 B1
DATED : August 3, 2004
INVENTOR(S) : McGee et al.

It is certified that error appears in the above-identified patent and that said Letters Patent is hereby corrected as shown below:

Column 9,
Line 49, replace "if $N>2*S$ and $N<S^2$" with -- if $N>2*S$ and $N<=S^2$ --.

Column 10,
Line 9, replace "limited-display" with -- limited display --.

Signed and Sealed this

Twenty-first Day of September, 2004

JON W. DUDAS
*Director of the United States Patent and Trademark Office*